United States Patent [19]

Yoshida et al.

[11] Patent Number: 5,667,685

[45] Date of Patent: Sep. 16, 1997

[54] FILTER FOR THE FILTRATION OF MOLTEN ALUMINUM

[75] Inventors: Tadahiro Yoshida, Narashino; Taro Kobayashi, Tamana; Nobuhiro Okuzono, Ohmuta; Yukio Kai, Narashino, all of Japan

[73] Assignee: Mitsui Mining & Smelting Co., Ltd., Tokyo, Japan

[21] Appl. No.: 677,086

[22] Filed: Jul. 9, 1996

[30] Foreign Application Priority Data

Jul. 19, 1995 [JP] Japan ................ 7-205211

[51] Int. Cl.$^6$ ............................... B01D 24/00
[52] U.S. Cl. ............ 210/510.1; 210/496; 210/500.25; 210/500.26; 55/523
[58] Field of Search .................. 210/510.1, 496, 210/500.25, 500.26; 55/523

[56] References Cited

U.S. PATENT DOCUMENTS

| | | |
|---|---|---|
| 3,524,548 | 8/1970 | McDonald et al. |
| 3,939,079 | 2/1976 | Uchiyama et al. |
| 5,145,806 | 9/1992 | Shirakawa et al. ............ 501/80 |
| 5,152,893 | 10/1992 | Shiraishi et al. ............ 210/496 |
| 5,194,154 | 3/1993 | Moyer et al. ............ 210/510.1 |

FOREIGN PATENT DOCUMENTS

| | | |
|---|---|---|
| 1-21018 | 1/1989 | Japan. |
| 1-21019 | 1/1989 | Japan. |
| 2-34732 | 2/1990 | Japan. |
| 5-138339 | 6/1993 | Japan. |

*Primary Examiner*—Ana Fortuna
*Attorney, Agent, or Firm*—Flynn, Thiel, Boutell & Tanis, P.C.

[57] ABSTRACT

A filter for the filtration of molten aluminum is obtained by binding 100 parts by weight of aggregate particles with 10 to 20 parts by weight of an inorganic binding material, said aggregate particles being composed of at least one alumina selected from the group consisting of fused alumina and sintered alumina and said inorganic binding material having a raw material composition comprising 25 wt. % to 35 wt. % of $SiO_2$, 30 to 40 wt. % of $B_2O_3$, 20 to 35 wt. % of $Al_2O_3$ and the balance being MgO. A filter according to the invention has a crystallinity of from 10% to 25% with the proviso that in the powder X-ray diffraction, the crystallinity is expressed in terms of a percentage of a peak height of $9Al_2O_3 \cdot 2B_2O_3$ appearing at $2\theta=16.5°$ to a peak height of $\alpha$-$Al_2O_3$ appearing at $2\theta=43.4°$. Needle crystals of $9Al_2O_3 \cdot 2B_2O_3$ which are formed in the inorganic binding material are not longer than 10 μm. Needle crystals of $9Al_2O_3 \cdot 2B_2O_3$ formed in the inorganic binding material can be obtained by firing the filter at 1,200° C. to 1,300° C.

5 Claims, No Drawings

FILTER FOR THE FILTRATION OF MOLTEN ALUMINUM

BACK GROUND OF THE INVENTION

1. Field of the Invention

This invention relates to a filter for the filtration of inclusions mixed in a molten metal, particularly molten aluminum or molten aluminum alloy (hereinafter called "molten aluminum" for the sake of brevity).

2. Description of the Related Art

In general, inclusions, particularly non-metal inclusions are mixed in molten aluminum. If such a molten metal is subjected to rolling after casting or the like and made into products such as disk materials without removing the inclusions from the molten metal, non-metal inclusions mixed therein cause defects such as pinholes. For the purpose of avoiding such defects, it is the common practice to remove the inclusions by filtering molten aluminum. Examples of the filter usable for the above purpose include the filter disclosed in Japanese Patent Publication No. 52-22327 (U.S. Pat. No. 3,939,079). The filter disclosed in the above publication is obtained by binding aggregate particles such as fused alumina with an inorganic binding material. In the above filter, the pore size is controlled appropriately so that stable filtration can be effected.

The conventional filter as described in the above publication generally contains an abundance of $SiO_2$ in the binding material so that upon filtration of molten aluminum through the conventional filter, there is a potential danger of silicon eluting out from the binding material to the molten aluminum and thereby polluting the molten aluminum. With a view to preventing the elution of silicon to the molten aluminum, filters comprising a $SiO_2$-free inorganic binding material are disclosed in, for example, Japanese Patent Publication No. 5-86459, Japanese Patent Publication No. 5-86460 and Japanese Patent Laid-Open No. 2-34732. These filters of course do not present a pollution problem of molten aluminum caused by the elution of silicon. They are, however, accompanied with the problems that, due to the poor binding state of the aggregate particles attributed to such a binding material, the resulting filter inevitably has insufficient strength and tends to cause clogging, resulting in an uneven filtration amount of the molten metal. There is, accordingly, a strong demand for a filter which can remove the problems of the elution of silicon, clogging and the like. Japanese Patent Laid-Open No. 5-138339 discloses, as a filter developed with a view of overcoming the above problems, a filter which acquires improved wettability with molten aluminum by the addition of a predetermined amount of $SiO_2$ to the inorganic binding material and is obtained by precipitating needle crystals of $9Al_3O_2 \cdot 2B_2O_3$ in the binding material.

In recent days, however, the requirement for the quality of aluminum products has been severer. In the case of aluminum alloy materials which are used as disk materials or the like, for example, even a few surface defects therein have a large influence and it is necessary to remove even minute inclusions from molten aluminum as much as possible. For the removal, a filter whose pore size is reduced by employing fine aggregate particles is used. The filter disclosed in the above Japanese Patent Laid-Open No. 5-138339, however, contains alot of crystal components in the binding material, has a high viscosity and inferior fluidity so that the binding material is distributed unevenly on the surface of the aggregate, resulting in the irregularities on the surface of the aggregate. In the case where the aggregate particles are fine, there sometimes happens a difficulty in the passage of molten aluminum because the pores of the filter clog because of the above irregularities.

SUMMARY OF THE INVENTION

An object of the present invention is to provide a filter which is capable of suppressing the above-described elution of silicon, has pores which do not clog even if the aggregate particles are fine, permits easy filtration of a molten metal; and has good efficiency.

There is thus provided a filter obtained by binding 100 parts by weight of aggregate particles composed of at least one alumina selected from the group consisting of fused alumina and sintered alumina with 10 to 20 parts by weight of an inorganic binding material composed, as raw materials, of from more than 25 wt. % to 35 wt. % of $SiO_2$, 30 wt. % to 40 wt. % of $B_2O_3$, 20 wt. % to 35 wt. % of $Al_2O_3$ and the balance being magnesium. When, in the X-ray diffraction, a percentage of the peak height of $9Al_2O_3 \cdot 2B_2O_3$ appearing at $2\theta=16.5°$ to the peak height of $\alpha\text{-}Al_2O_3$ appearing at $2\theta=43.4°$ is expressed as crystallinity, the filter according to the present invention has a crystallinity of 10 to 25%. There is also provided a filter in which needle crystals of $9Al_2O_3 \cdot 2B_2O_3$ appearing in the inorganic binding material is not longer than 10 μm. The needle crystals of $9Al_2O_3 \cdot 2B_2O_3$ appearing in the inorganic binding material can be obtained by controlling the firing temperature of the filter to 1,200° to 1,300° C.

DESCRIPTION OF THE PREFERRED EMBODIMENTS

The reason why the raw material(s) for the aggregate particles is(are) limited to at least one of fused alumina and sintered alumina in the present invention is because they show excellent corrosion resistance to a molten metal, particularly, molten aluminum. In the present invention, the inorganic binding material is added in an amount of 10 to 20 parts by weight, based on 100 parts by weight of the aggregate particles. When the amount is smaller than 10 parts by weight, the aggregate particles cannot be bound sufficiently and the aggregate particles may drop off from the filter. Amounts greater than 20 parts by weight, on the other hand, narrow the pore size of the filter, which tends to cause clogging. Amounts outside the above range are therefore not preferred. $SiO_2$ contained in the inorganic binding material has the effects of lowering the viscosity of the binding material and promoting vitrification, thereby heightening the strength of the filter. When the amount of $SiO_2$ is not greater than 25 wt. %, the filter does not have sufficient strength. When the amount exceeds 35 wt. %, on the other hand, there is a possibility of the binding material being substituted with molten aluminum, thereby polluting the molten aluminum. In addition, when the amount of $B_2O_3$ is smaller than 30 wt. %, the viscosity of the binding material is low and the fluidity is poor so that the binding material is distributed unevenly on the surface of the aggregate, the pore size is reduced and, furthermore, the filter strength becomes insufficient. When the amount of $B_2O_3$ is greater than 40 wt. %, on the other hand, a too low viscosity of the binding material causes the binding material to flow out downwardly and it becomes impossible to obtain a uniform filter.

In the present invention, a comparatively large amount of $SiO_2$ is contained in the binding material, but molten aluminum is hardly polluted by the filter of the present invention, because the surface of the binding material the filter according to the present invention is covered with needle crystals of aluminum borate ($9Al_2O_3 \cdot 2B_2O_3$) which are formed by the reaction between $Al_2O_3$ and $B_2O_3$, that is, the binding material components. The aluminum borate shows excellent corrosion resistance against molten aluminum. So, even if the surface of the binding material of the filter is brought into contact with molten aluminum, pollution of the molten metal does not occur. With respect to the amount of $Al_2O_3$, 20–35 wt. % is required. When the amount of $Al_2O_3$ is smaller than 20 wt. %, the precipitation amount of aluminum borate crystals on the surface decreases, which tends to cause pollution of the molten metal. Amounts of $Al_2O_3$ greater than 35 wt. %, on the other hand, excessively increase the crystal components in the binding materials so that the binding material is distributed unevenly on the surface of the aggregate and clogging occurs. MgO is added to adjust the viscosity of the binding material.

When, in the powder X-ray diffraction of a filter, a percentage of the peak height of $9Al_2O_3 \cdot 2B_2O_3$ appearing at $2\theta=16.5°$ to the peak height of $\alpha$-$Al_2O_3$ appearing at 2θ43.4° is expressed as the crystallinity of aluminum borate, it is preferred that the crystallinity of aluminum borate formed in the binding material of the filter according to the present invention is 10 to 25%. The above-described crystallinity is used as a standard for the degree of formation of aluminum borate crystals because of the following reasons. Described specifically, the filter according to the present invention is obtained by binding aggregate particles of alumina ($\alpha$-$Al_2O_3$) with a small amount of an inorganic binding material. The filter is therefore composed mainly of $\alpha$-$Al_2O_3$. The inorganic binding material is composed of a crystal component and a glass component so that if the peak of a component other than $\alpha$-$Al_2O_3$ is detected, it can be considered to be the crystal component of the binding material. In the case of the filter according to the present invention, aluminum borate is detected as a crystal. The crystallinity of aluminum borate is defined based on the percentage of the peak height of aluminum borate to the peak height of $\alpha$-$Al_2O_3$ derived from the aggregate. When the crystallinity exceeds 25%, the crystal component in the binding material increases, which improves corrosion resistance against molten aluminum but due to the high viscosity and inferior fluidity of the binding material, the binding material is distributed unevenly on the surface of the aggregate, thereby narrowing the pore size of the filter. When the crystallinity is lower than 10%, the amount of the glass component becomes larger with a decrease in the amount of the crystal component, leading to a deterioration in the corrosion resistance against molten aluminum, thereby causing a potential danger of polluting the molten metal.

In the present invention, furthermore, it is preferred that the needle crystals of aluminum borate in the binding material are short and dense. Described specifically, when molten aluminum is brought into contact with the binding material, it is brought into contact with only the crystals of aluminum borate in the binding material. The needle crystals of aluminum borate are preferred to be not longer than 10 μm and, at such length, excellent corrosion resistance is exhibited. When the crystals become longer than 10 μm accompanied with the enlargement of the crystals, a reduction in the density of the crystals occurs in the binding material so that the molten aluminum tends to be brought into contact with the glass component in the binding material. In this case, therefore, there is a potential danger of the substitution of the glass component with the molten aluminum and elution of the component.

The needle crystals of aluminum borate as described above can be obtained by adjusting the firing temperature to 1,200° C. to 1,300 C. upon the firing of the filter. At firing temperatures lower than 1,200° C., the crystals of aluminum borate are not formed sufficiently, which deteriorates the corrosion resistance. In addition, the inorganic binding material is not sufficiently molten at such a temperature. In this case, the viscosity of the inorganic binding material is high and its fluidity is poor, which results in uneven distribution of the binding materials on the surface of the aggregate particles and clogging of the pores. Firing temperatures exceeding 1,300° C., on the other hand, promote the growth of the needle crystals of aluminum borate and thereby enlarge them, whereby the corrosion resistance against molten metal is deteriorated. In addition, such a high temperature tends to cause evaporation of $B_2O_3$ in the binding material and there appears another problem that a filter of a uniform composition cannot be obtained.

Compared with the filter, as is disclosed in the above-described Japanese Patent Laid-Open No. HEI 5-138339, in which a predetermined amount, which is controlled to be lower, of $SiO_2$ has been incorporated, the filter according to the present invention is free of an adequate strength problem and has excellent wettability with molten aluminum. Furthermore, the filter according to the present invention contains $SiO_2$ in an amount not smaller than 25 wt. % which guarantees good filtration and has needle crystals of aluminum borate, which are dense and have an excellent corrosion resistance, precipitated on its surface by adjusting the crystallinity of the crystals so that not only the pollution of the molten metal by the elution of silicon can be suppressed but also the strength and filterability are both excellent.

The present invention will hereinafter be described by the following examples.

EXAMPLES

Fused alumina #24 was used as an aggregate. To 100 parts by weight of the aggregate, the inorganic binding material was added at the various compositions shown in Table 1. To each of the resulting mixtures, an organic binder, such as dextrin, and water were added in proper amounts, followed by kneading. After forming the kneaded mixture into a pipe having an outer diameter of 100 mm, an inner diameter of 60 mm and a length of 850 mm, the pipe so obtained was dried and then fired at a predetermined temperature, whereby a test pipe was obtained. The properties of each test pipe were studied in accordance with the following testing methods, respectively.

Bending Strength

A test piece of 100×20×18 mm was cut out from the test pipe. It was maintained at 800° C. for 20 minutes in an atmosphere-temperature-set electric furnace and then was subjected to a bending test under the conditions of two-point support and one-point load at the support spun of 90 mm.

Elution Amount of Components

One part by weight of the test pipe was immersed in 10 parts by weight of high-purity molten aluminum (at least 99.99%) of 740° C. Immersion was maintained for 55 hours and then the filtration of the molten metal was conducted, which procedure was performed in repetition. After sampling, the aluminum component was analyzed and the value so obtained was compared with the component before the test. The difference is indicated as an elution amount of the component.

Filterability of Al

The filterability of molten aluminum was evaluated by the Al Impregnation height of the filter. The test pipe was allowed to stand in an aluminum retainer and was then preheated. To the test pipe, molten aluminum of 730° C. was poured, and it was maintained for 24 hours at a predetermined head pressure. The test pipe was then taken out from the retainer. After cooling, the test pipe was longitudinally cut and the penetration height of aluminum in the test pipe was measured. The difference between the head of the molten aluminum and the height so measured was indicated as the Al impregnation height.

Crystallinity

The test pipe was pulverized and subjected to powder X-ray diffraction. The crystallinity was measured in accordance with the definition as described above. Described specifically, the peak height of $9Al_2O_3 \cdot 2B_2O_3$ appearing at $2\theta=16.5°$ was divided by the peak height of $\alpha\text{-}Al_2O_3$ appearing at $2\theta=43.4°$ and the percentage of the quotient so obtained was indicated as crystallinity.

Crystal Length

The surface of the test pipe was observed by SEM and the length of the crystal on the surface of the binding material was measured. These results are collectively shown in Table 1.

different from those obtained according to the present invention in the amount of the inorganic binding material added and the composition of the raw materials for the inorganic binding material. Various properties of the test pipes obtained in Comparative Examples 3–9 were studied, but their evaluation was also not good.

In the present invention, as described above, a filter having excellent strength, corrosion resistance and filterability of molten aluminum can be obtained by properly adjusting the amount of the inorganic binding material to be added and the composition of the raw materials.

What is claimed is:

1. A filter for the filtration of molten aluminum, said filter being obtained by binding 100 parts by weight of aggregate particles with 10 to 20 parts by weight of an inorganic binding material, said aggregate particles being composed of at least one alumina selected from the group consisting of fused alumina and sintered alumina and said inorganic binding material having a raw material composition comprising 25 to 35 wt. % of $SiO_2$, 30 to 40 wt. % of $B_2O_3$, 20 to 35 wt. % of $Al_2O_3$ and the balance being MgO.

2. A filter according to claim 1, which has a crystallinity of from 10% to 25%, with the proviso that in powder X-ray diffraction, the crystallinity is expressed in terms of a percentage of a peak height of $9Al_2O_3 \cdot 2B_2O_3$, appearing at $2\theta=16.5°$, to a peak height of $\alpha\text{-}Al_2O_3$, appearing at $2\theta=43.4°$.

TABLE 1

|  | Example |  |  |  |  |  |  |  |  | Comparative Example |  |  |  |  |  |  |  |  |
|---|---|---|---|---|---|---|---|---|---|---|---|---|---|---|---|---|---|---|
|  | 1 | 2 | 3 | 4 | 5 | 6 | 7 | 8 | 9 | 1 | 2 | 3 | 4 | 5 | 6 | 7 | 8 | 9 |
| Composition of raw materials for the inorganic binding material (wt. %) |  |  |  |  |  |  |  |  |  |  |  |  |  |  |  |  |  |  |
| $SiO_2$ | 27 | 27 | 30 | 30 | 35 | 30 | 30 | 30 | 30 | 30 | 30 | 20 | 40 | 30 | 30 | 30 | 30 | 30 |
| $B_2O_3$ | 30 | 35 | 30 | 35 | 30 | 30 | 35 | 35 | 35 | 35 | 35 | 35 | 25 | 45 | 30 | 40 | 35 | 35 |
| $Al_2O_3$ | 30 | 25 | 25 | 25 | 25 | 30 | 25 | 25 | 35 | 25 | 25 | 30 | 20 | 25 | 40 | 15 | 25 | 25 |
| MgO | 13 | 13 | 15 | 10 | 10 | 10 | 10 | 10 | 5 | 10 | 10 | 15 | 15 | 0 | 0 | 15 | 10 | 10 |
| Amount added (wt. %) | 15 | 15 | 15 | 15 | 15 | 15 | 10 | 20 | 15 | 15 | 15 | 15 | 15 | 15 | 15 | 15 | 7 | 25 |
| Firing temperature (°C.) | 1250 | 1250 | 1250 | 1250 | 1250 | 1250 | 1250 | 1250 | 1250 | 1250 | 1250 | 1250 | 1250 | 1250 | 1250 | 1250 | 1250 | 1250 |
| Bending strength (Mpa) |  |  |  |  |  |  |  |  |  |  |  |  |  |  |  |  |  |  |
| RT | 6.5 | 10.5 | 14.1 | 13.5 | 15.2 | 11.5 | 6.2 | 16.9 | 8.5 | 5.5 | 7.8 | 7.5 | 16.4 | 3.2 | 9.2 | 12.6 | 2.4 | 20.1 |
| 800° C. | 4.8 | 5.4 | 4.5 | 5.4 | 4.2 | 5.6 | 2.8 | 6.2 | 4.5 | 3.5 | 4.9 | 3.2 | 2.5 | 2.2 | 4.5 | 2.3 | 1.1 | 6.1 |
| Elution amount of the components (PPM) |  |  |  |  |  |  |  |  |  |  |  |  |  |  |  |  |  |  |
| Si | 10 | 19 | 35 | 19 | 35 | 21 | 13 | 24 | 9 | 55 | 88 | 11 | 182 | 30 | 13 | 231 | 15 | 21 |
| B | 2 | 3 | 14 | 3 | 14 | 5 | 5 | 9 | 5 | 10 | 40 | 3 | 25 | 11 | 5 | 125 | 6 | 7 |
| Mg | 3 | 2 | 5 | 2 | 5 | 3 | 3 | 4 | 1 | 3 | 18 | 1 | 12 | 0 | 2 | 20 | 2 | 5 |
| Al impregnation height (cm) | 42 | 38 | 35 | 42 | 35 | 40 | 36 | 44 | 43 | 55 | 40 | 60 | 37 | 46 | 65 | 37 | 40 | 60 |
| Crystallinity (%) | 22 | 18 | 14 | 16 | 12 | 15 | 14 | 21 | 16 | 12 | 24 | 40 | 8 | 7 | 44 | 5 | 10 | 18 |
| Crystal length (μm) | 8 | 7 | 7 | 6 | 5 | 8 | 6 | 10 | 7 | 3 | 12 | 20 | 7 | 8 | 30 | 9 | 7 | 8 |
| Synthetic evaluation | O | O | O | O | O | O | O | O | O | X | X | X | X | X | X | X | X | X |

From Table 1, it has been found that test pipes obtained in Examples 1–9 in accordance with the amounts of the inorganic binding material added and compositions of the raw materials for the inorganic binding material had excellent filter strength, corrosion resistance against molten aluminum and filterability of molten aluminum. It was also found that in Comparative Examples 1 and 2, the firing temperature of the filter did not fall within a range of 1,200° C.–1,300° C., so that the test pipes so obtained were evaluated inferior. Test pipes obtained in Comparative Examples 3–9 were 3. A filter according to claim 2, wherein needle crystals of $9Al_2O_3 \cdot 2B_2O_3$ are formed in the inorganic binding material and have a length of 10 μm or lower.

4. A filter according to claim 2 wherein the filter is fired at 1,200° C. to 1,300° C.

5. A filter for the filtration of molten aluminum, said filter being obtained by binding 100 parts by weight of aggregate particles with 10 to 20 parts by weight of an inorganic binding material, said aggregate particles being composed of at least one alumina selected from the group consisting of fused alumina and sintered alumina and said inorganic binding material having a raw material composition consisting essentially of 25 to 35 wt. % $SiO_2$, 30 to 40 wt. % $B_2O_3$, 20 to 35 wt. % $Al_2O_3$ and the balance being MgO, said inorganic binding material comprising needle crystals of $9Al_2O_3 \cdot 2B_2O_3$ having a length of not greater than 10 mm.

* * * * *